INVENTORS
Thomas J. Griffen,
Hulon R. Taylor, &
Frederick L. Colombo
ATTORNEY

Jan. 23, 1968 — T. J. GRIFFEN ETAL — 3,364,778
TRANSMISSION CONTROL LINKAGE
Filed June 29, 1965 — 2 Sheets-Sheet 2

INVENTORS
Thomas J. Griffen,
Hulon R. Taylor, &
Frederick L. Colombo
a.m. Heiter
ATTORNEY United States Patent Office 3,364,778
Patented Jan. 23, 1968

3,364,778
TRANSMISSION CONTROL LINKAGE
Thomas J. Griffen, Dearborn, Hulon R. Taylor, Inkster, and Frederick L. Colombo, Fraser, Mich., assignors to General Motors Corporation, Detroit, Mich., a corporation of Delaware
Filed June 29, 1965, Ser. No. 467,929
16 Claims. (Cl. 74—473)

ABSTRACT OF THE DISCLOSURE

Transmission control linkage operatively connecting a transmission selector lever with a transmission including an elongated trunnion for transmitting apply force from the shift tube to a rotatable yoke operatively connected to a transmission selector valve. The trunnion has one end portion supported for sliding pivotal movement in a bearing secured to the vehicle frame while the other end portion of the trunnion is disposed at an angle to the major body portion thereof and extends through openings in spaced arms of the rotatable yoke. Spring devices are employed between the end portion of the trunnion and the arms of the yoke to provide a close fit to reduce rattle while allowing the transmission to oscillate and vibrate in its mountings so that transmission movements will not be transmitted through the yoke, trunnion, and other parts of the linkage to the selector lever.

Figure 1:
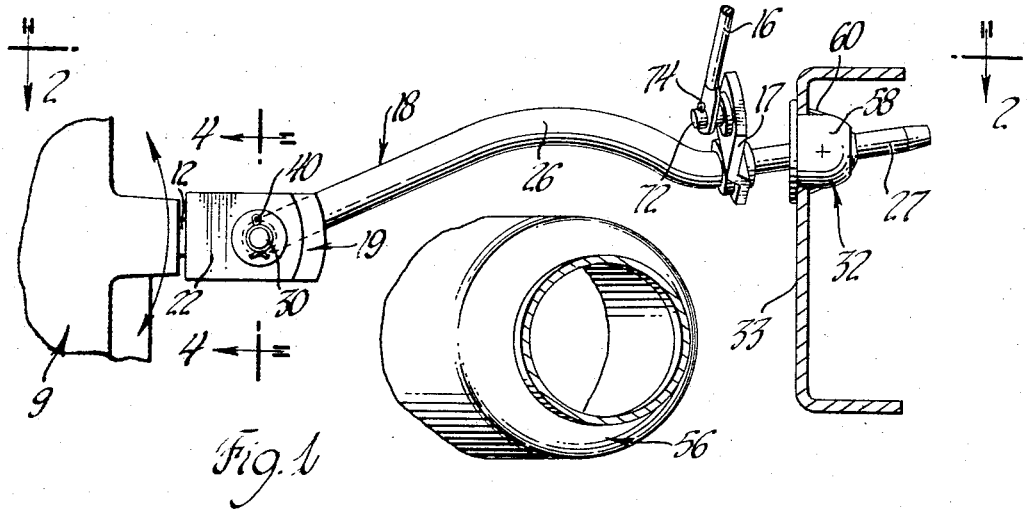

This invention relates to transmission control linkages and particularly to a transmission control including a motion isolating linkage connecting a selector actuated shift tube supported by a vehicle body and a transmission actuator member supported by a transmission.

The selector valve of an automatic transmission utilized in a vehicle is usually controlled by the operator of the vehicle through a linkage system for conditioning the transmission for various drive ranges and park. This linkage connects a relay rod operated by a shift tube and connected selector lever supported by the vehicle body and the selector valve operating rod which projects from and is supported by the transmission. Movement of the relay rod rotates the linkage thereby rotating the selector valve operating rod to condition the transmission for selective drive ranges or park.

The use of flexible or soft engine and transmission mounts in modern vehicles while providing for smooth vehicle operation have permitted considerable motion of the engine and coupled transmission relative to the vehicle body. These motions include the oscillations of the power unit and transmission about a longitudinal or roll axis and movement parallel to this axis. Since the transmission control linkage is mechanically connected to the transmission, such transmission movement could cause undesired linkage motion and rattle.

The present invention provides a new and improved transmission control incorporating motion isolating linkage which allows the engine and transmission to move in the mounts without material disturbance of the transmission control and which permits effective transmission control by shift lever manipulation.

In the preferred form of the invention a bridging trunnion member, mounted for universal movemnt in the vehicle frame by an improved bearing assembly, connects a shift tube actuated relay rod to a rotatable yoke member fastened to a selector valve operating rod in a transmission. The trunnion is pivotally mounted in the yoke in a manner which allows the transmission to oscillate or vibrate without imparting appreciable vibrations to the trunnion and the selector lever connected to the shift tube.

An object of this invention is to provide a control linkage connecting a first member experiencing vibrations and a control member in which the linkage permits relative movement between certain parts thereof so that vibratory energy will not be transmitted to the control member.

Another object of this invention is to provide a transmission control including an improved lost-motion linkage connection between a transmission control lever and a transmission in which transmission movements will be accommodated by the lost-motion linkage to abate the transmittal of vibration from the transmission to the control lever.

Another object of this invention is to provide a transmission control linkage connecting first and second members in which the linkage is supported by a new and improved universal-type bearing assembly.

Another object is to provide in a linkage a new and improved bearing assembly which may be quickly and easily inserted in a support and which mounts part of the linkage for limited universal movement therein.

Another object of this invention is to provide a lost-motion linkage having new and improved spring devices disposed between selected parts of the linkage to abate rattle in the linkage and to provide hardened and replaceable wear surfaces.

Figure 2:
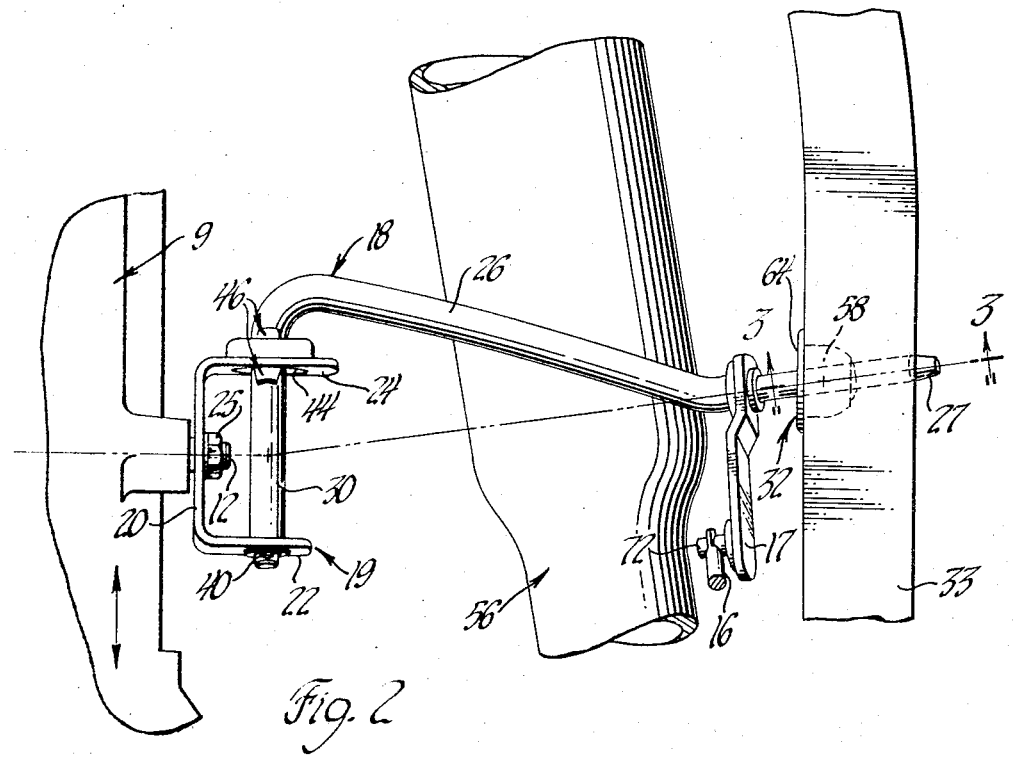
Figure 3:
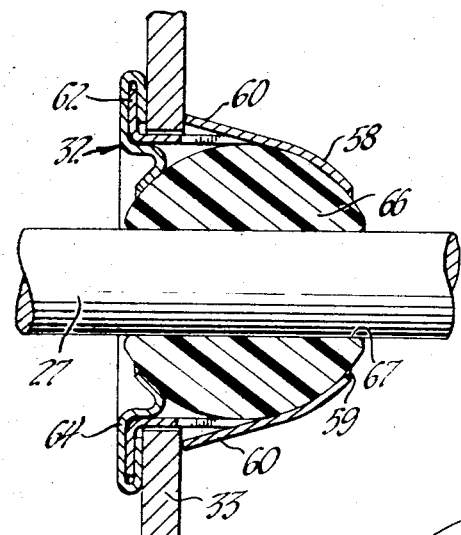
Figure 3A:
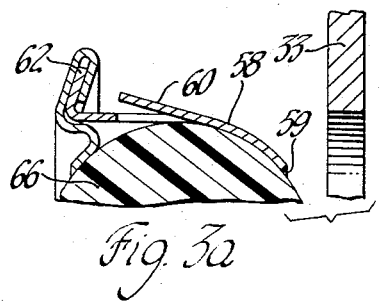
Figure 4:
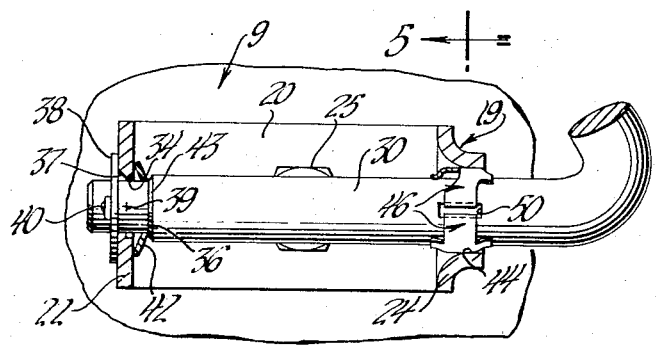
Figure 5:
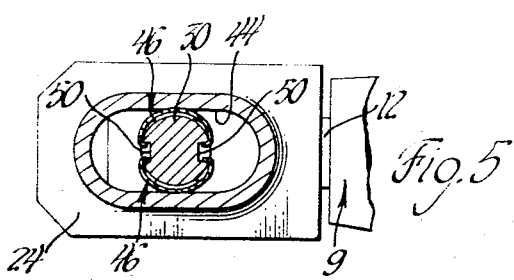
Figure 6:
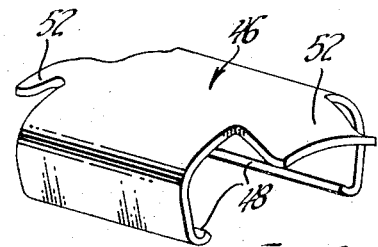

These and other objects of this invention will be apparent from the following description and drawings, in which:

FIGURE 1 is a front view of a preferred form of the invention;
FIGURE 2 is a top view taken along lines 2—2 of FIGURE 1;
FIGURE 3 is a view taken along line 3—3 of FIGURE 2;
FIGURE 3a is a view similar to FIGURE 3 showing the elements thereof before installation;
FIGURE 4 is a view taken along line 4—4 of FIGURE 1;
FIGURE 5 is a view taken along line 5—5 of FIGURE 4;
FIGURE 6 is a perspective view of a spring element which is utilized in the invention; and
FIGURE 7 is a perspective view of the invention as applied to a transmission and control therefor.

Figure 7:
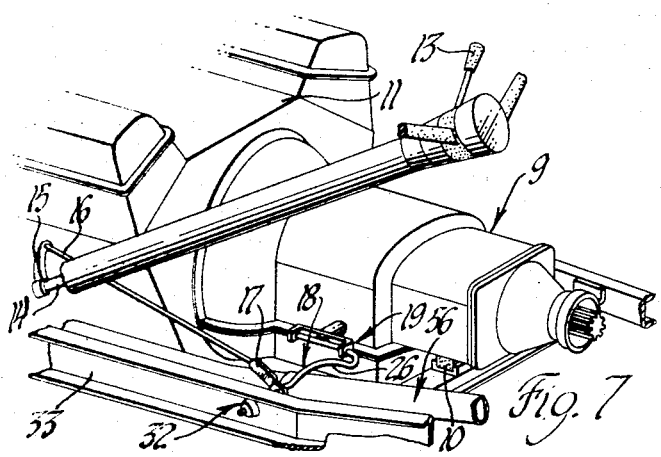

Turning now to the drawings, FIGURES 1, 2 and 7 illustrate a vehicle transmission shown at 9 in which a rotatable selector valve control shaft 12 is utilized to shift a selector valve, not shown, for conditioning the transmission for different drives and park. The transmission and coupled vehicle power plant 11 are mounted to the vehicle frame by conventional flexible mounts such as mount 10 shown in FIGURE 7. The selector valve control shaft is manipulated by the vehicle operator through selector lever 13 rotatably supported on the steering column. As shown in FIGURE 7 the lever 13 is used to rotate shift tube 14 and the connected lever 15. When this lever is rotated, relay rod 16 pivotally connected to the end of lever 15 turns lever 17 and the linkage generally indicated at 18 to rotate the control shaft 12.

As illustrated in the drawing, the linkage includes a yoke 19 having a base portion 20 and two spaced, projecting arm members 22 and 24. The base portion 20 and the shaft 12 are suitably keyed and fastened by nut 25, or otherwise joined, so that turning of the yoke will turn the shaft 12 to actuate the transmission selector valve. A bridging trunnion 26 which includes an elongated curved body portion terminating in a straight free-end portion 27 and an angularly disposed end portion 30 operatively connects the yoke to lever 17. End portion 30 of the bridging trunnion extends substantially at right angles to the body portion and is movably mounted in suitable openings in the arm portions while the free end portion 27 is mounted in the bearing assembly 32 connected to vehicle frame 33.

As illustrated best by FIGURE 4, the arm portion 22 has an opening 34 which is slightly larger in diameter than the diameter of reduced end 36 of portion 30 trunnion and which is cut back at 37 to allow limited movement of the end portion of the trunnion about pivot point 39 as indicated.

The end of the trunnion is retained in the arm 22 by means of washer 38 and a cotter pin 40 which extends through the end of trunnion portion 30. A spring washer 42 contacting shoulder 43 of the trunnion biases the end of the trunnion portion 30 to the right in FIGURE 4 and holds the washer closely against the outer face of the arm 22. This construction provides for a tight fit between the end of the trunnion and the arm portion 22. By virtue of this construction the connection between the end portion 30 and the arm 22 is free from rattle but relative movement of the trunnion within the opening 34 can occur under certain operating conditions. The portion 30 of the trunnion also extends through an elongated slot 44 in arm 24 shown best by FIGURES 2, 4 and 5. This slot has a length sufficient to permit substantial movement of the rod along the length of the slot and also has a width greater than the diameter of the angularly extending end portion 30 of the trunion which extends through this slot.

Anti-rattle springs 46 are utilized to center the trunnion for movement along the longitudinal axis of the slot and to prevent rattle between the trunnion and arm 24. These springs are generally U-shaped in cross-section and have inwardly extending jaws 48. As best shown in FIGURE 5, these jaws engage edge portions of diametrically opposed recesses 50 in the trunnion to retain the spring in position on the trunnion. The springs are preferably made with outwardly and downwardly extending leaf portions 52 which are curved at their extremities to contact and closely fit the outer periphery of the trunnion. The upper part of the spring contacts the walls of the arm member 24 which defines slot 44. The anti-rattle spring provides a tight fit between the slot and the trunnion to eliminate rattle and the necessity of holding the rod end 30 and slot 44 to close tolerance for a tight but slidable fit. Furthermore, the spring 46 provides a hardened wear surface and one which may be easily replaced when necessary.

The trunnion has a curved central portion, as shown in FIGURE 1, to avoid interference by vehicle components such as exhaust pipe 56 when rotated by the selector lever as will appear below. The free end portion is substantially straight and extends into the bearing assembly 32, as indicated above.

The bearing assembly includes a cylindrical housing 58, U-shaped in cross section, which is closed by a cap portion 64 having a resilient flange clinched to the resilient flange of the housing. As shown in FIGURE 3a, the clinched flanges are toed inwardly to produce spring tension when installed as shown in FIGURE 3. The housing and the cap form a receptacle for rotatable ball 66 which may be of any suitable material and preferably one which is self-lubricting, such as Delrin or Teflon. Resilient tangs 60 extend outwardly from the housing which facilitate assembly of the housing into a circular opening in the vehicle frame and which securely retain the bearing assembly within the frame on installation. The flange 62 and the end of tangs 60 provide flexible gripping jaws capable of tightly gripping various width supports. The end 27 of the trunnion extends within an opening 67 in ball 66. The opening 67 has an internal diameter slightly greater than the diameter of the free-end portion of the trunnion so that the trunnion may slide in the ball. The housing 58 is cut away as at 59 to permit movement of the ball and the end of the trunnion about a center of rotation within the housing. It will be seen that the bearing assembly 32 thus provides a universal-type connection for the end of the trunnion which pivotally and slidably supports one end of the trunnion.

The lever member 17 is used to operatively connect the trunnion to the relay rod 16. As shown in FIGURES 1 and 2, the lever member 17 has one end rigidly connected to the trunnion in the vicinity of the bearing assembly and as close to frame 33 as practical so that motion of the trunnion will cause very little movement of lever 17. The relay rod 16 is pivotally connected to stud 72 formed on the lever and is retained thereon by a cotter pin or other suitable retaining means 74.

By manipulating a selector lever, the relay rod is actuated to rotate the lever 17 and the attached trunnion 26. This will impart rotation to the yoke 19 and to the connected shaft 12 for operation of the selector valve. It will be seen that this rotation will not be hindered by the exhaust pipe 56 due to the curved configuration of the trunnion extending over the exhaust pipe. The limits of rotation of trunnion 26 and yoke 18 are established by suitable stop mechanism (not shown) located within the transmission.

It will be understood that if there is torisional oscillation of the transmission and engine about a longitudinal axis or movement parallel to that axis due to the flexible mountings of the vehicle engine and transmission, the bearing assembly 32 fixed to frame 33 will restrain the movement of the end 27 of the trunnion which will pivot in the bearing assembly by rotation of ball 66. Since lever 17 is mounted close to pivot point 33, its movement will be slight on movement of the transmission and therefore will not materially disturb relay rod 16, lever 15, shift tube 14 and the connected shift lever 13. It will also be understood that the universal mounting of the trunnion 27 allows the relative motion of the transmission and the vehicle frame so that the linkage will not transmit these motions to the selector lever. The anti-rattle springs 42 and 46 will, during this time, effectively prevent any rattle between the trunnion and the yoke.

Applicants' linkage can be readily and easily assembled or disassembled. For assembly, the bearing assembly can be simply pushed into the frame without the use of tools and the tangs 60 will deflect outwardly to hold the assembly in installed position. Furthermore, springs 46 are quickly installed by pressing them on the trunnion end 30 until the jaws 48 engage recesses 50. The end of the trunnion is then inserted through arm 24 of the previously affixed yoke and the spring washer 42 is then installed. The end of the trunnion is then inserted through the opening in arm 22 and the washer 38 and cotter pin 40 are installed. Disassembly is the reverse of this procedure. By thus facilitating such assembly and disassembly, applicants have not only eliminated a tedious task but also reduced cost of initial assembly and repair.

From the above it will be appreciated that applicants have provided a lost-motion link connection between the relay rod of a selector lever and a transmission which will permit the transmission to torsionally, or otherwise, vibrate but which will not transmit any of these vibrations to the selector lever. With applicant's particular bearing assembly the trunnion can be quickly connected to the vehicle and disconnected with relative ease, if necessary. Applicants' lost-motion link connection provides a means by which the selector valve may be accurately positioned to condition the transmission for the various drive ranges and which will be reliable for the entire life of the vehicle.

It will be appreciated that other modifications may be made to the present invention without departing from the spirit of applicants' teachings. It will also be understood that this invention is not to be restricted to the particular materials and embodiments shown and described but only to the invention as claimed.

We claim:

1. A transmission control linkage comprising, a rotatable yoke member having first and second spaced arm members connected by a base member to a transmission, a trunnion member having an elongated body portion and an angularly extending leg member, said first arm member having an opening pivotally receiving the end of said leg member, said second arm member being formed with a slot for slidably receiving said leg member, anti-rattle spring means seated on said leg member and contacting portions of said second arm member defining said slot, a bearing assembly for said end of said body portion of said trunnion, said bearing assembly including a pivotal ball member pivotally and slidably supporting said body portion, a housing for said ball member, resilient means on said housing for securing said housing to a support, and trunnion operator means secured to said body portion closely adjacent the pivot provided by said ball member.

2. In a selector actuated control linkage for a transmission, an elongated trunnion member having a main body portion and opposite end portions disposed at an angle to said body portion, a yoke member connected to a transmission having a base portion and first and second spaced arms, said first arm having an opening therein, said second arm having a slot therein, one of said end portions of said trunnion member being received in said opening and said slot, U-shaped spring means mounted on said one end portion contacting the walls of said second arm defining said slot, a bearing assembly supporting the other of said end portions of said trunnion member, said bearing assembly including a rotatable ball member having a bore slidably receiving said other end portion, a link member fixed to said other end portion of said trunnion member closely adjacent said bearing assembly and between said beaaring assembly and said yoke member, said one end portion extending through said first arm being pivoted in said opening therein and slidable in said slot in said second arm on actuation of said link member or oscillation of the transmission.

3. Transmission control linkage comprising, a first rotatable member for conditioning a transmission for selective drive ranges, an elongated trunnion member having one end operatively connected to said rotatable member, a bearing assembly slidably and pivotally supporting the other end of said trunnion member, a trunnion operator member secured to said trunnion member closely adjacent the pivot provided by said bearing assembly, means for rotating said trunnion operator member and thereby rotate said trunnion member and said first rotatable means for selecting various transmission drive ranges, a support, and said bearing assembly having spaced opposing resilient means to securely hold said assembly in said support.

4. The linkage defined in claim 3, said bearing assembly including a housing, said opposing resilient means being provided by a flange and outwardly flaring fingers on said housing, said flange and said fingers having the capacity to receive various sized supports between the flange and the ends of said fingers.

5. The linkage defined in claim 4 wherein said fingers have ends directed toward said flange, said flange being inclined in an opposite direction, said fingers and said flange providing opposing gripping surfaces having the capacity to grip support members of different widths.

6. A transmission control linkage comprising, a rotatable yoke member having first and second spaced arm members connected by a base member, a rotatable actuator member rigidly connected to said base member, a trunnion member having an elongated body portion and a leg portion extending at an angle to each other, said first arm member having an opening pivotally receiving the end of the leg portion, said second arm member being formed with a slot for slidably receiving said leg member, spring means mounted on said leg member providing a flexible fitting between said leg member and the portions of said second arm member defining the slot therein.

7. The structure defined in claim 6 above wherein said spring means are provided by first and second spring members, said spring members contacting opposing portions of said second arm member defining said slot.

8. The structure defined in claim 7 wherein each of said spring members is formed with opposing jaws for gripping said trunnion.

9. In a linkage, a bearing assembly including a housing, outwardly flared resilient means on said housing for holding said housing in a support, a ball member rotatably mounted in said housing, a bore in said ball member, a rod slidably mounted in said bore, a cap member for said housing for retaining said ball member therein, said cap member having an outwardly extending retainer flange, said cap member having an opening therein to allow said rod member to move in any direction within a limited range.

10. In a bearing assembly for a trunnion member, a housing having outwardly flaring finger portions secured thereto for retaining said housing in a support, a member rotatably mounted in said housing having an opening therein slidably receiving said trunnion member, a cap member retaining said rotatable member in said housing, said cap member having a resilient flange portion generally included toward said finger portions, said flange and said finger portions providing resilient jaw means to receive support structure therebetween and thereby secure said housing to support structure, said cap member having an opening therein permitting said trunnion member to be pivoted in any direction within a range limited by the boundary of the opening in said cap member.

11. In a transmisison control linkage a rotatable yoke member, said yoke member having a plurality of spaced arms, each of said arms having an opening therein, a trunnion member having an angularly extending end portion extending through the openings in said arms, spring means seated on said end portion and contacting the internal surface of one of said arms which forms the opening therein, said spring means having leaf portions which contact the periphery of said trunnion member, and said spring means normally centering said end portion between the walls forming said last-mentioned opening.

12. In a linkage, a trunnion member, an arm member having a slot therein receiving said trunnion member, first and second spring members mounted on said trunnion member contacting walls in said arm member which define said slot, each of said springs having a U-shaped cross section, each said spring having oppositely extending leaf portions which contact the periphery of said trunnion member, said springs normally centering said trunnion member along the length of said slot.

13. In a linkage for connecting a control to a rotatable actuator, a yoke member having a base portion and spaced arm portions, each of said arms having an opening therein, said base portion being rigidly secured to the actuator, a trunnion member having an elongated body portion and first and second angularly-extending end portions, said first end portion being inserted through the openings in said arms, said opening in one of said arms being slightly larger than said end portion which projects therethrough to permit said trunnion to pivot in said opening, a spring means mounted on said end portion contacting the internal surface of said arm portion, a retainer fixed to the part of the end portion which projects through said last-mentioned arm portion for retaining said end portion in said yoke member, said second opening being in the form of an elongated slot, and spring members mounted on said end portion and contacting the walls which define said slot.

14. In a bearing assembly, an elongated member, a housing member, said housing member having generally cylindrical walls inwardly curved at one end thereof, said housing further having an outwardly extending circular flange at the other end thereof, said walls having resilient finger portions struck therefrom and extending toward said flange, a ball member rotatably mounted in said housing, said ball member having a bore therethrough slidably receiving said elongated member, said member closely fitting said bore, a cap member for said housing having a flange clinched over the flange of said housing to form a resilient flange portion, said flange portion and said finger portion being normally inclined toward each other, said flange and said finger portions providing flexible jaws to receive support members of different widths and thereby secure said housing to support structure, said cap member and said housing having aligned enlarged openings formed therein to permit said elongated member to project therethrough, said cap member and said housing combining to provide a generally spherical internal bearing surface of a diameter substantially equal to the diameter of said ball member allowing said ball member to rotate about a pivot point on rotation of said elongated member about said pivot point.

15. In a transmission control linkage, a transmission selector, a rotatable trunnion member, means rotatably and slidably supporting one end of said trunnion member for limited universal movement, means operatively connecting the other end of said trunnion member to a transmission, means adjacent said first-mentioned means operatively connecting said trunnion member to said selector, a housing for said first-mentioned means, said housing having a retainer flange and resilient outwardly-flaring fingers for gripping a support therebetween.

16. In a transmission control linkage, a transmission selector, a rotatable trunnion member, means rotatably and slidably supporting one end of said trunnion member for limited universal movement, means operatively connecting the other end of said trunnion member to a transmission, means adjacent said first-mentioned means operatively connecting said trunnion member to said selector, said second-mentioned means being a yoke member having first and second arms, each said arm having an opening therein for receiving said trunnion member, spring means disposed between the periphery of part of the trunnion member and the portion of one of said arms defining the opening therein.

References Cited
UNITED STATES PATENTS

| | | | |
|---|---|---|---|
| 1,664,669 | 4/1928 | Denyes | 74—490 |
| 3,034,838 | 5/1962 | Abel | 308—72 |
| 3,080,769 | 3/1963 | Wilson et al. | 74—484 |

MILTON KAUFMAN, *Primary Examiner.*